(12) United States Patent
Noekleby et al.

(10) Patent No.: US 10,428,287 B2
(45) Date of Patent: Oct. 1, 2019

(54) SUBSEA FLUID PROCESSING SYSTEM

(71) Applicant: AKER SOLUTIONS AS, Lysaker (NO)

(72) Inventors: Pal Helge Noekleby, Sandefjord (NO); Geir Inge Olsen, Oslo (NO); Thomas Foerde, Asgardstrand (NO); Michael Hilditch, Asker (NO)

(73) Assignee: AKER SOLUTIONS AS, Lysaker (NO)

( * ) Notice: Subject to any disclaimer, the term of this patent is extended or adjusted under 35 U.S.C. 154(b) by 222 days.

(21) Appl. No.: 15/540,259

(22) PCT Filed: Dec. 29, 2015

(86) PCT No.: PCT/NO2015/050263
§ 371 (c)(1),
(2) Date: Jun. 28, 2017

(87) PCT Pub. No.: WO2016/108697
PCT Pub. Date: Jul. 7, 2016

(65) Prior Publication Data
US 2018/0002623 A1    Jan. 4, 2018

(30) Foreign Application Priority Data
Dec. 29, 2014    (NO) .................................. 20141566

(51) Int. Cl.
*C10L 3/10* (2006.01)
*B01D 53/22* (2006.01)
(Continued)

(52) U.S. Cl.
CPC .......... *C10L 3/104* (2013.01); *B01D 19/0036* (2013.01); *B01D 53/22* (2013.01);
(Continued)

(58) Field of Classification Search
CPC .................. B01D 53/22; B01D 53/226; B01D 2257/504; B01D 2317/025;
(Continued)

(56) References Cited

U.S. PATENT DOCUMENTS 6,221,131 B1    4/2001 Behling et al.
2002/0195251 A1    12/2002 Underdown et al.
(Continued)

FOREIGN PATENT DOCUMENTS

DE    10 2006 015 088 A1    10/2007
EP    0 908 219 A1    4/1999
(Continued)

OTHER PUBLICATIONS

N. Maurand et al.: "Coupling compositional flow, thermal effects and geochemistry reactions when injecting $CO_2$ in a carbonated oil field", 7$^{th}$ Trondheim CCS Conference, TCCS-7, Jun. 5-6, 2013, Trondheim, Norway, Energy Procedia, vol. 51, pp. 316-325 (2014).

*Primary Examiner* — Jason M Greene
(74) *Attorney, Agent, or Firm* — Norman B. Thot (57) ABSTRACT

A subsea fluid processing system which receives a wellstream flow. The subsea fluid processing system includes a pressure control device which regulates a pressure of the wellstream flow, a gas-liquid separator unit which receives the wellstream flow downstream of the pressure control device and which provides a liquid stream and a gas stream, a first membrane separator which receives the gas stream and which provides a retentate stream and a permeate stream, a compressor which receives the permeate stream and which provides a compressed permeate stream, and a discharge cooler which receives the compressed permeate stream and which provides a cooled compressed permeate stream for injection into a subsurface reservoir. A density of (Continued)

the cooled compressed permeate stream is higher than a density of the compressed permeate stream.

18 Claims, 3 Drawing Sheets

(51) Int. Cl.
*E21B 43/36* (2006.01)
*E21B 43/40* (2006.01)
*B01D 19/00* (2006.01)
*B01D 63/04* (2006.01)
*E21B 43/16* (2006.01)

(52) U.S. Cl.
CPC ......... *B01D 53/226* (2013.01); *B01D 63/046* (2013.01); *C10L 3/101* (2013.01); *E21B 43/36* (2013.01); *E21B 43/40* (2013.01); *B01D 2053/224* (2013.01); *B01D 2256/24* (2013.01); *B01D 2257/504* (2013.01); *B01D 2313/22* (2013.01); *B01D 2313/38* (2013.01); *B01D 2317/02* (2013.01); *B01D 2317/04* (2013.01); *C10L 2290/06* (2013.01); *C10L 2290/46* (2013.01); *C10L 2290/54* (2013.01); *C10L 2290/548* (2013.01); *C10L 2290/562* (2013.01); *C10L 2290/58* (2013.01); *E21B 43/164* (2013.01); *Y02C 10/10* (2013.01)

(58) Field of Classification Search
CPC ... B01D 2319/025; E21B 43/36; E21B 43/40; E21B 43/164; C10L 3/102; C10L 3/104; C10L 2290/548
See application file for complete search history.

(56) References Cited

U.S. PATENT DOCUMENTS

| | | |
|---|---|---|
| 2003/0131726 A1 | 7/2003 | Thomas et al. |
| 2004/0099138 A1* | 5/2004 | Karode ............... B01D 53/226 95/214 |
| 2006/0042463 A1 | 3/2006 | Frantz |
| 2013/0266380 A1* | 10/2013 | Capron ................ E21B 43/36 405/184.4 |
| 2013/0291499 A1* | 11/2013 | Gardner ............... B01D 46/003 55/423 |
| 2015/0090117 A1* | 4/2015 | Baggerud ............. B01D 53/22 95/30 |
| 2016/0047217 A1* | 2/2016 | Haagensen Hoy ..... E21B 43/36 210/170.01 |

FOREIGN PATENT DOCUMENTS

| | | |
|---|---|---|
| NO | 2000 1607 A1 | 10/2001 |
| WO | WO 95/15428 A1 | 6/1995 |
| WO | WO 2013/124339 A1 | 8/2013 |

* cited by examiner

SUBSEA FLUID PROCESSING SYSTEM

CROSS REFERENCE TO PRIOR APPLICATIONS

This application is a U.S. National Phase application under 35 U.S.C. § 371 of International Application No. PCT/NO2015/050263, filed on Dec. 29, 2015 and which claims benefit to Norwegian Patent Application No. 20141566, filed on Dec. 29, 2014. The International Application was published in English on Jul. 7, 2016 as WO 2016/108697 A1 under PCT Article 21(2).

FIELD

The present invention relates to a subsea fluid processing system, and more particularly to a system which facilitates the removal of gaseous components, in particular sour gases, in a petroleum well stream in a subsea environment.

BACKGROUND

Gas purification can generally be divided into three main categories:
Dehydration;
Hydrocarbon dew point control; and
Acid gas removal.
Conventional technologies used for these processes can generally be divided into the following categories:
Absorption of a gas component into a chemical;
Adsorption of a gas component on a solid surface;
Membrane permeation by selective barriers to gas components;
Condensing the gas stream in order to remove a liquefied phase; and
Chemical conversion of a gas component into a new liquid or solid component which is easier to separate from the gas.

Which technology to use in a given application depends on the type of gas component to be separated from the bulk phase, the concentration of the component, and requirements of the composition of the product gas. For the removal of sour components, e.g., $CO_2$ and $H_2S$, from natural gas, the most common method is using solvents such as alkanolamines. The absorption takes place in absorber columns and the alkanolamines are recovered in stripper columns by increasing the temperature and flashing off the $CO_2$.

Amine absorption separation has been in commercial use for many decades and provides a product gas that meets requirements as to remaining $CO_2$ content, heating value, etc., but which requires a substantial amount of equipment with the energy consumption related to the recovery of the solvents being high. The contactor columns can have diameters of up to about 5 meters and total heights of up to about 30 meters. The dimensions of the strippers are in the same range. Emissions of toxic components are also an issue related to this gas purification technology.

Another technology being used in the recent years is separation of gas by using membranes. The membranes typically consist of a porous matrix with a coated layer that consists of a polymer that is selective as to which gas molecules can pass through and which are retained. Such membranes have proven to be quite successful since they are not dependent on using solvents in the purification process.

The above mentioned processes for natural gas purification (removal of sour gas components) are normally applied at onshore gas processing facilities or at topsides facilities when gas processing is applied in an offshore environment.

US 2002/0195251 A1 describes a subsea system for treatment of natural gas where the gas flow from a natural gas well is pumped up, led through a heat exchanger and to a gas/liquid separator, from which the gas phase is cooled before it is led to a membrane separator, which can include one or more membrane separators. The purified gas is transported on from the separation unit, while the separated impurities are pumped down into a water-containing rock formation. This system does not, however, describe a compression unit and a cooling unit following the membrane separation unit, in order to cool the permeate flow before it is injected into the well.

Maurand, N et al., "Coupling compositional flow, thermal effects and geochemistry reactions when injecting $CO_2$ in a carbonated oil field", $7^{th}$ Trondheim CCS Conference, TCCS-7, Jun. 5-6, 2013, Trondheim, Norway, Energy Procedia 51 (2014) 316-325, describes computer modeling performed to investigate the thermal effect and geochemical reactions of injecting $CO_2$ into an oilfield. Simulations were performed at four different temperatures of the injected $CO_2$ gas. The results of the simulations show that the cooling of the oil reservoir by injecting $CO_2$ increases the mobility in the reservoir and contributes positively to the recovery of oil from the field.

DE 10 2006 015 088 describes a process for the removal of water and other non-condensable components from natural gas. The process comprises compressing and cooling of the inflowing gas mixture in a first compressor stage, where the resulting condensate from the natural gas stream is removed in a first gas/liquid separator, and the gas is led through a demister and further to a first membrane separation stage. In the separation stage, the impurities are removed over the membrane and this flow is compressed, cooled, condensate is removed in a gas/liquid separator, and is led via a demister to a second membrane separation stage. Retentate from the first and second separation stage is removed for further use, while the collected liquid is discharged.

US 2006/0042463 A1 describes a process and a method for the removal of acid components in a flow of natural gas by using a two-stage membrane separation process. The crude gas is cooled and pretreated before it is brought into contact with a membrane separation unit. Permeate from this unit is cooled then compressed, led through a filter separator, to enter the second membrane separation stage. Permeate from this stage is cooled before being led to a micro turbine generator.

$CO_2$ has been used for decades to flood oil reservoirs since this can improve the recovery of hydrocarbons from the reservoir. All current applications of this technology in an industrial scale are performed on onshore fields. In the recent years, however, this technology was increasingly considered for use in offshore oil fields due to the desire to extract additional oil resources. This method also provides for the simultaneous storage of $CO_2$ in the oil reservoirs and therefore contributes to the abatement of greenhouse gases.

When $CO_2$ or hydrocarbon gases are used to flood oil reservoirs, this is mainly arranged by the intermittent injection of the gas and water in an operation called Water Alternating Gas or "WAG". Another way to flood such a reservoir is by the simultaneous injection of the fluids. In this case, the operation is called "SWAG".

A major constraint to applying $CO_2$ flooding in offshore oil reservoirs is, however, the handling of the well stream that results from the flooding. A part of the $CO_2$ gas will follow the production of hydrocarbons and water and lead to rapidly increasing amounts and concentrations of $CO_2$ which will reach the well stream separation equipment on the offshore production facility. These facilities may not have been designed for treating such flow conditions. Very high modification costs may thus be needed to accommodate the facility with new treatment capacity. As noted above, the equipment needed for $CO_2$ separation by conventional methods is generally significant and with little spare weight and space on offshore facilities, the commercial use of offshore $CO_2$ flooding has to date not been sanctioned in commercial projects.

Moreover, when $CO_2$ or hydrocarbon gases are mixed with or contact water, as in WAG or SWAG operations, great attention must be paid to the mixing or contacting conditions to avoid the formation of hydrates. This typically occurs in the temperature range of 15-20° C., depending on the pressure. These temperatures may be reached when transporting $CO_2$ in underwater pipelines unless these are insulated or heated. When such a risk for hydrate formation exists, valves are usually arranged to avoid the two fluids coming into contact with each other through leaking valves. Antifreeze chemicals such as MEG or methanol are used as a buffer between water and hydrocarbon gas/$CO_2$ in an over-pressurized barrier so that a potential leakage is routed from the MEG/methanol to the water/gas side.

SUMMARY

An aspect of the present invention is to provide an improved fluid processing system technology, in particular technology which is suitable for use with offshore or subsea petroleum fields.

In an embodiment, the present invention provides a subsea fluid processing system which is configured to receive a wellstream flow. The subsea fluid processing system includes a pressure control device configured to regulate a pressure of the wellstream flow, a gas-liquid separator unit configured to receive the wellstream flow downstream of the pressure control device and to provide a liquid stream and a gas stream, a first membrane separator configured to receive the gas stream and to provide a retentate stream and a permeate stream, a compressor configured to receive the permeate stream and to provide a compressed permeate stream, and a discharge cooler configured to receive the compressed permeate stream and to provide a cooled compressed permeate stream for injection into a subsurface reservoir. A density of the cooled compressed permeate stream is higher than a density of the compressed permeate stream.

BRIEF DESCRIPTION OF THE DRAWINGS

The present invention is described in greater detail below on the basis of embodiments and of the drawings in which.

DETAILED DESCRIPTION

In an embodiment, the present invention provides a subsea fluid processing system adapted to receive a wellstream flow comprising:

a pressure control adapted to regulate the pressure of the wellstream flow;

a gas-liquid separator unit adapted to receive the wellstream flow downstream of the pressure control device and provide a liquid stream and a gas stream;

a first membrane separator adapted to receive the gas stream and provide a retentate stream and a permeate stream;

a compressor adapted to receive the permeate stream and provide a compressed permeate stream; and a discharge cooler adapted to receive the compressed permeate stream and to provide a cooled permeate stream for injection into a subsurface reservoir, wherein, the cooled permeate stream has higher density than the compressed permeate stream.

This advantageously provides a system that enables subsea separation of a well stream containing high amounts and concentrations of sour gases and re-injection of such gases into a reservoir. By providing a subsea system which can be placed near a wellhead, long transport in underwater pipelines, for example, to a topside facility, is avoided, and temperature control of the gases to be injected is made possible.

In an embodiment of the present invention, a subsea fluid processing system is provided wherein the first membrane separator can, for example, be arranged in a membrane unit the membrane unit comprising a second membrane separator arranged in series with the first membrane separator, and wherein a demister is arranged between the membrane separator and the second membrane separator.

This advantageously provides an improved separation performance of the system.

In an embodiment, the present invention provides a subsea fluid processing system as described above, further comprising a heat exchanger, whereby the heat exchanger can, for example, be adapted to transfer heat from the compressed permeate stream to the wellstream flow.

This advantageously improves the separation of gas from liquid in the system, and simultaneously reduces the cooling load on the cooler.

In an embodiment, the present invention provides a subsea fluid processing system as described above, whereby an inlet cooler and an inlet separator can, for example, be arranged in the wellstream flow upstream of the pressure control device.

This advantageously allows liquids to be separated out from the wellstream at high pressure, thereby reducing the load on the components downstream of the pressure control device. Any absorbed gas, e.g., $CO_2$ absorbed in water forming part of the well stream, will in particular be separated out at this stage.

In an embodiment, the present invention provides a system as described above where the cooler can, for example, be adapted to provide the cooled permeate stream at a temperature higher than a pre-set hydrate formation temperature.

This advantageously prevents hydrate formation and provides flow stability, also in the case of, for example, WAG/SWAG operations. By providing a subsea fluid processing system which can be located near a subsea wellhead according to the present invention, the cooled permeate stream for injection can be maintained above a hydrate formation temperature without requiring insulated or heated underwater pipelines.

In an embodiment of the present invention, the cooler can, for example, be actively controlled to adjust a cooling power of the cooler.

This advantageously allows the system to adapt to any given operating conditions, e.g., with or without WAG/SWAG operation.

In an embodiment, the present invention provides a subsea fluid processing system, wherein the first membrane separator and/or the second membrane separator can, for example, be arranged in a pressure vessel adapted for subsea use and wherein the pressure vessel houses a membrane cartridge assembly, made up of a plurality of membrane cartridges, which is part of the first or second membrane separators.

This advantageously provides a compact and robust membrane system with high performance which is suitable for subsea use and which provides the possibility of replacing individual membrane modules, e.g., for maintenance or repair, without replacing the entire fluid processing system.

The present invention thus provides a technical solution to the separation of a well stream resulting from the flooding of an oil reservoir to achieve increased oil recovery. The present invention also provides that most of the injected $CO_2$ remains in the oil reservoir since the present invention provides for a separation and reinjection of the $CO_2$. The present invention also allows less use of external $CO_2$ supply for offshore $CO_2$ EOR than previously required and will accordingly open up a widespread use of $CO_2$ for EOR in offshore environments.

The present invention also provides that $CO_2$ gas will be reinjected and permanently stored in the reservoir, thereby contributing to a sustainable oil and gas production with simultaneous storage of $CO_2$ and greenhouse gas abatement.

The present invention further provides for the exploitation of oil fields that have very high concentrations of $CO_2$ in the associated gas. Cost efficient exploitation of oil fields in remote (for example, arctic) areas will also benefit from the present invention since the solution is based on subsea processing and reduces the need for topside equipment.

The present invention typically allows for the removal of more than 95% of the $CO_2$ coming from a well stream resulting from an oil reservoir that is flooded with $CO_2$.

BRIEF DESCRIPTION OF THE DRAWINGS

A more detailed and non-limiting description of exemplary embodiments of the present invention is set forth below under reference to the drawings.

Figure 1:
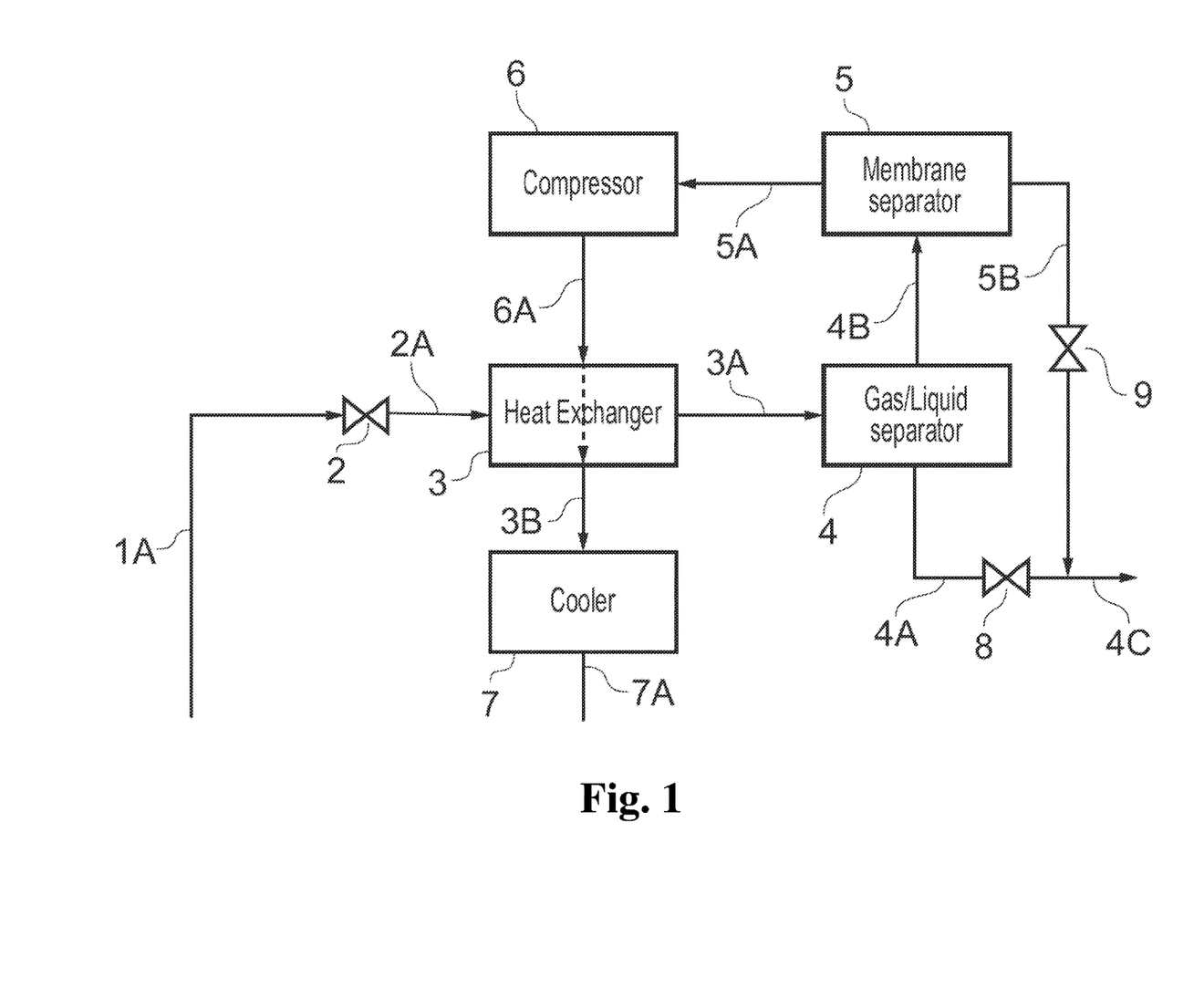
FIG. 1 shows a subsea fluid processing system according to an embodiment of the present invention.

One embodiment of a subsea fluid processing system according to the present invention is shown in FIG. 1. FIG. 1 shows a well stream 1A from the production of hydrocarbons from a subsurface well where the wellhead is located at the seabed. The well stream 1A may be provided to the subsea fluid processing system directly from a wellhead or via other subsea processing equipment. The well stream 1A typically contains a mixture of water, oil, hydrocarbon gases, $CO_2$, $H_2S$ and water vapor. To prepare the well stream 1A from a subsurface wellhead, it is usually transported to a topsides facility for further separation and treatment. In an embodiment, the present invention describes how a well stream 1A that contains high amounts and concentrations of sour gases such as $CO_2$ in combination with oil and hydrocarbons can be treated in a subsea arrangement to separate and reinject $CO_2$ into the oil reservoir and to provide transportation of valuable oil and hydrocarbons to a topsides facility.

Referring to FIG. 1, the well stream 1A is passed through a choke valve 2 in order to obtain a favorable lower pressure for flashing off gases in the downstream separator 4. In such a case, the temperature in stream 2A will be reduced compared to well stream 1A due to the cooling effect of the pressure reduction. To obtain the desired separation conditions for gases and liquids in separator 4, stream 2A is heated up via a heat exchanger 3.

The heat exchanger 3 is characterized by a compact heat exchanger arrangement for subsea application to utilize the heat in the hot compressed gas coming from a compressor 6 (described below) to heat up the cooled well stream 2A.

The heated well stream 3A is routed to a gas/liquid separator 4. This separator 4 is characterized by a compact arrangement that is suitable for subsea conditions where the liquid phases of water and hydrocarbons are separated from the gaseous phase. The liquid phase stream 4A from the separator 4 may be mixed with the retentate stream 5B from the membrane separator 5 (described below). This mixed stream 4C can then be routed to an existing topsides facility for further stabilization of the oil and transportation, or directly to shore. A small pressure reduction will occur over the membrane separator 5 so that the pressure in retentate stream 5B will be at a slightly lower pressure than liquid phase stream 4A. In order to provide proper flow assurance by the mixing of these streams, a choke valve 8 can be installed in liquid phase stream 4A. Correspondingly, a choke valve 9 can be installed in retentate stream 5B.

If the pressure is reduced in the choke valve 2 to a level that does not allow the free flow of the mixed stream 4C to the topsides facility, a pump must be installed in this stream. This pump is not shown in FIG. 1.

The gaseous stream 4B leaving the gas/liquid separator 4 contains a mixture of hydrocarbon gases, $CO_2$ and water vapor. The gas mixture is passed through a membrane separator 5 that has selective properties to let certain gas molecules pass through and retain others. The membrane separator 5 may comprise a membrane unit which is made up of a material such as, for example, PEEK, and has a coating or polymer material that provides a selective passing of, for example, $CO_2$ gas through the membrane. A high differential pressure across the membrane is usually required to obtain the desired separation efficiency. In this membrane arrangement, the typical hydrocarbon gas components are retained in the stream and leave the membrane separator as a retentate stream 5B that is enriched in HC content compared to the inlet gaseous stream 4B. The stream 5A is enriched in gases such as $CO_2$ and other inorganic components. This stream 5A has a lower pressure than the inlet gaseous stream 4B due to the pressure drop across the membrane. The pressure in stream 5A is set by the compressor speed.

The membrane separator 5 is characterized by a compact arrangement of membrane cartridges that are suitable for subsea application.

The stream 5A needs a significantly higher pressure in order to allow for injection of the separated gaseous components back into the reservoir or another storage facility. Stream 5A is accordingly passed through a compressor 6 that increases the pressure to the necessary degree for injection. The compression work causes a significant increase of temperature of the gas stream and the stream 6A leaves the compressor 6 at a higher pressure and temperature than the inlet stream 5A.

The compressor 6 is characterized by a compressor system that is applicable for subsea use. The compressor 6 can receive power supply from a topsides facility or through underwater cables. Interstage cooling, wherein gas is cooled after partial compression, may be utilized.

The hot compressed gas in stream 6A is further passed through the heat exchanger 3 to heat up the well stream 2A if necessary, as described above. The somewhat cooled stream 6A leaves the heat exchanger 3 as stream 3B and is further passed through the cooler 7. This cooler 7 is designed to cool the $CO_2$ enriched gas mixture in stream 3B to a temperature required to bring the $CO_2$ from the gaseous phase into a so called dense phase where the density is considerably higher. This causes a favorable static fluid head pressure in the injection well that receives the cooled $CO_2$ from stream 7A which in turn provides a favorable injection pressure for the $CO_2$ enriched stream to flow into a subsurface reservoir.

The cooler 7 may be arranged with several parallel tubings utilizing ambient seawater as a cooling medium. The cooler 7 can also be equipped with an active control if an accurate temperature control and cooling is required for the stream 3B.

If an additional pressure is needed for injection of the dense phase gas stream 7A into a reservoir, a pump must be installed in this stream. This pump is not shown in FIG. 1.

In certain cases, there may be special requirements to the quality of the hydrocarbon phase that will be sent to the topsides facility or to the purity of the gaseous stream that shall be compressed and reinjected.

Figure 2:
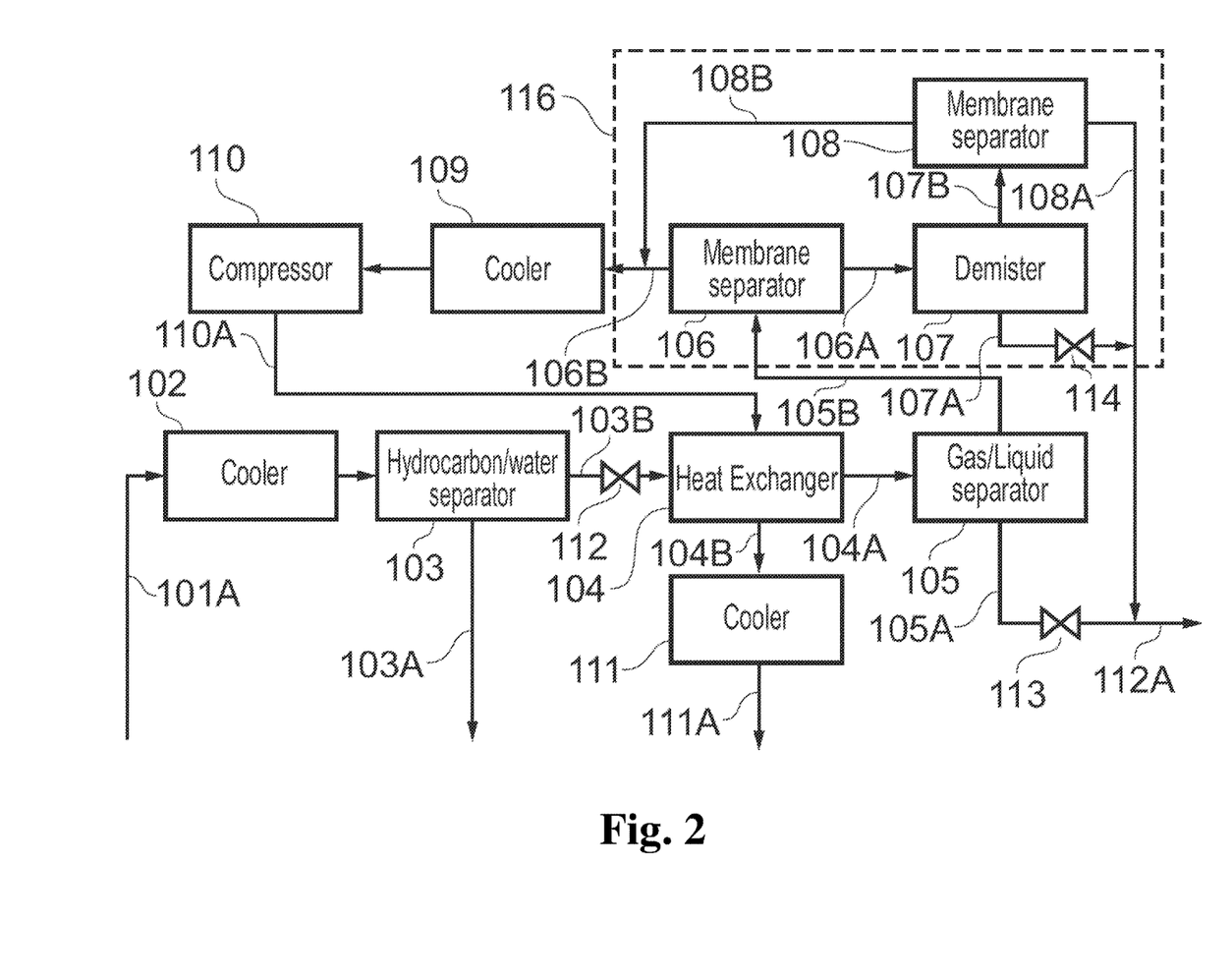
FIG. 2 shows a subsea fluid processing system according to an alternative embodiment of the present invention.

FIG. 2 shows a subsea fluid processing system according to an alternative embodiment of the present invention. Well stream 101A once again originates from the production of hydrocarbons from a subsurface well where the wellhead is located at the seabed. Well stream 101A typically contains a mixture of water, oil, hydrocarbon gases, $CO_2$ and water vapor. The present invention describes how a well stream 101A that contains high amounts and concentrations of sour gases such as, for example, $CO_2$ in combination with oil and hydrocarbons, can be treated to separate and reinject $CO_2$ into the oil reservoir.

In the first treatment operation, the well stream 101A is cooled in a cooler 102 to utilize the high solubility of $CO_2$ in water at high pressure and low temperature compared to the inlet well stream and to thereby remove a part of the $CO_2$ through the water. The pressure reduction also provides improved conditions for the flashing of $CO_2$ from the liquid phase via gas/liquid separator 105. The cooler 102 is designed to provide the desired temperature by applying ambient seawater as a cooling medium. The cooling conditions at high pressure and the desired temperature provides that a part of the $CO_2$ in well stream 101A stays as absorbed gas in the water phase in the well stream leaving the cooler 102. The separator 103 is designed to separate the water phase from the other hydrocarbon components in the well stream and the water stream 103A having a saturated content of $CO_2$ is then separated from the well stream and can be routed into the injection well of the reservoir. Stream 103A can alternatively also be mixed with stream 111A before being injected into the injection well.

Separator 103 is further characterized by a design that also allows for a separation of sand particles that might follow the production of hydrocarbons. Separator 103 provides an outlet of the sand particles via the water 103A and will consequently provide that no clogging will take place in the downstream membrane separators.

Depending on the depth of the reservoir and reservoir pressure, a pressure reduction may be needed in stream 103A to provide the required pressure of stream 103A at the seabed.

Stream 103B leaving separator 103 typically has a high pressure and a low temperature. In order to obtain the optimum conditions for separating the $CO_2$ from the hydrocarbon mixture in stream 103B, and at the same time provide a temperature range for allowable operation of the membrane separator, stream 103B will typically be equipped with a pressure reduction device such as a choke valve 112. The passing of stream 103B through this pressure reduction device causes a pressure reduction and a subsequent cooling, dependent on the magnitude of the gas phase and pressure in stream 103B. This stream 103B is now utilized as a cooling medium for the compressed $CO_2$ leaving the compressor 110.

The heated stream 104A is then routed to the gas/liquid separator 105 where the gas phase stays in equilibrium with the liquid hydrocarbon mixture. Gas/liquid separator 105 is designed to provide for a separation of the gas and liquid phases. The gas/liquid separator 105 is designed as a compact device that typically can be installed in a subsea environment.

The stream 105A leaving the gas/liquid separator 105 contains mainly the oil phase including some volatile components that are in equilibrium with the oil phase at the temperature and pressure conditions of the gas/liquid separator 105.

The gaseous stream 105B leaving the gas/liquid separator 105 contains a mixture of hydrocarbon gases and inorganic gases such as $CO_2$ and typically traces of other inorganic gases. This gaseous stream 105B is directed to a membrane unit 116, comprising one or more membrane separators 106, 108, equivalent to membrane separator 5 described above.

The membrane separators 106, 108 may be provided in one or several membrane vessels providing a compact arrangement that is suitable for subsea conditions, described in further detail below (see FIG. 3.)

Optionally, if using more than one membrane separator 106, 108 in membrane unit 116, a demister 107 may be provided between two membrane separators, as is shown in FIG. 2. The hydrocarbon rich retentate stream 106A from membrane separator 106 leaves the membrane separator 106 at a slightly lower pressure than the inlet gaseous stream 105B. This retentate stream 106A is routed to a demister 107 to remove any potential liquid components. This liquid stream 107A will contain a mixture of hydrocarbons (and water if water is not removed in separator 103 as previously described). The liquid stream 107A can be mixed into the hydrocarbon stream 105A from the gas/liquid separator 105.

Stream 107B contains a gaseous mixture of hydrocarbon gases and $CO_2$ and is routed into a second membrane separator 108. Second membrane separator 108 is in principle similar to membrane separator 106. In second membrane separator 108, a further separation of the gas is performed and the hydrocarbon rich retentate stream 108A is mixed with liquid stream 107A.

Due to a slightly higher pressure in streams 105A and 107A compared to the retentate stream 108A, a pressure reduction device will typically be placed in these streams to even out pressures before mixing. These pressure reduction devices are shown in FIG. 2 as throttle valves 113 and 114.

The permeate stream 108B from the membrane separator 108 is enriched in $CO_2$ content and is mixed with the $CO_2$ enriched stream 106B from membrane separator 106. This mixed stream is directed into a cooler 109. Cooler 109 may use ambient seawater as a cooling medium.

The cooler 109 provides that the gas conditions for the downstream compressor 110 and heat exchanger 104 are met. The temperature of the cooled gas stream from cooler 109 is chosen to not exceed a level which would produce an unacceptable high temperature in the compressed gas from the compressor 110 and to provide conditions for a more efficient compression process. Interstage cooling, wherein gas is cooled after partial compression, may be utilized. The compressor 110 can receive a power supply from a topsides facility or through underwater cables.

The $CO_2$ enriched and compressed gas 110A is heated in the compression process and this heat is used to heat up the cooled well steam 103B in the heat exchanger 104. Heat exchanger 104 is accordingly designed to heat stream 103B.

The partly cooled stream 104B is further cooled in a cooler 111. Cooler 111 is a subsea cooler which uses ambient seawater as a cooling medium. Cooler 111 is chosen to provide sufficient temperature reduction of the stream 104B to bring the gaseous, $CO_2$-rich stream 104B into a high density phase. At certain conditions of pressure and temperature, $CO_2$ will turn into a so called dense phase with a density typically associated with a liquid. This is obtained by the cooling in cooler 109. The dense phase 111A will provide a substantial liquid head pressure when reinjected into the injection well of the reservoir. If the reservoir pressure is higher than the liquid head provided by the dense phase $CO_2$ enriched stream or the injection well is located far away from the subsea separation plant, a pump may additionally be required (not shown in FIG. 2). The injected $CO_2$ will then be recirculated in the oil reservoir and used for increasing oil recovery.

Stream 112A is the product stream with substantially enriched hydrocarbon content compared to the well stream 101A. Stream 112A can be routed to a topsides facility for further stabilization of the oil phase, or directly to an onshore facility. If the pressure of stream 112A becomes too low for allowing a flow by natural pressure to the topsides facility, a subsea pump may be installed to provide the flow to the facility (not shown in FIG. 2).

While FIG. 2 shows a system comprising a number of additional components compared to that in FIG. 1, it will be understood that each of the components cooler 102, separator 103, membrane unit 116, and cooler 109 can be used individually or in any combination within the scope of the present invention. Each of these components provides a distinct function and advantage in the system, and may, for example, be combined with the system shown in FIG. 1 according to specific field operational requirements.

In a further embodiment according to the present invention, there is provided a subsea separation plant according to any of the embodiments described above, wherein the membrane separator is arranged in a pressure vessel adapted for subsea use. FIG. 3 (*a*) illustrates the membrane separator 1010 in an assembled and in a disassembled form. The membrane separator 1010 comprises a pressure vessel 1020 which in the shown configuration is made of a top shell 1030 and a bottom shell 1040 flanged together. The membrane separator 1010 further comprises a gas inlet 1050 for receiving gas to be treated (for example, stream 4B in FIG. 1), a treated gas (or retentate) outlet 1060 and a permeate (also known as tail gas) outlet 1070. Access to the interior of the membrane separator 1010 can be achieved by separating the top shell 1030 and bottom shell 1040 as is shown in FIG. 3, (b) and (c). The pressure vessel 1020 houses a membrane cartridge assembly 1080, which is made up of a plurality of membrane cartridges. The membrane cartridges have an outer sleeve, which houses a substantially cylindrical membrane element. The membrane element can be based on hollow fiber membranes. An opening in each sleeve allows gas to enter the cartridge and flow past the membrane element. In the lower part of the pressure vessel 1020, there is arranged a treated gas header which receives gas from each cartridge sleeve (i.e., from the retentate side of the membrane element), and is connected to the treated gas outlet 1060.

Figure 3:
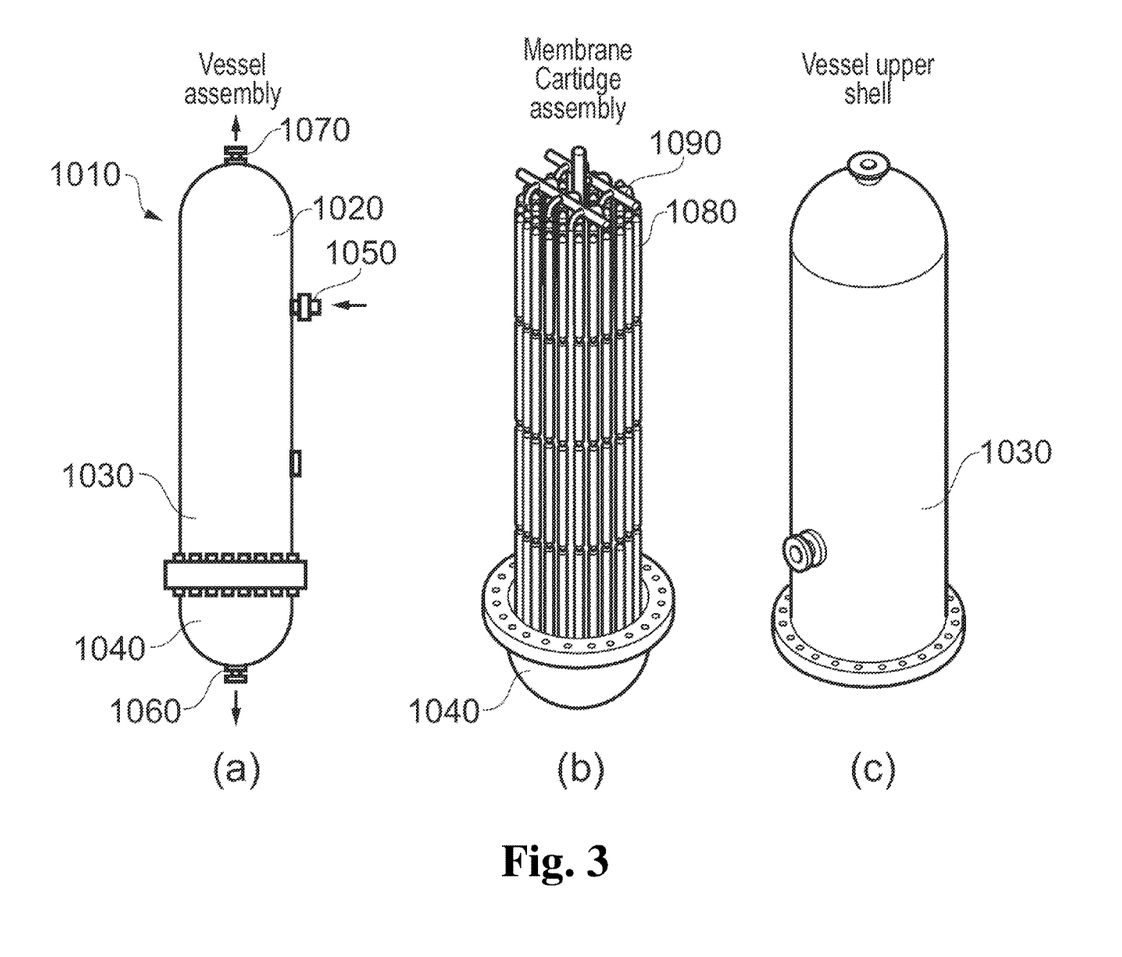
FIG. 3 shows a membrane separator suitable for subsea use in an assembled and in a disassembled form.

The membrane separator as shown in FIG. 3 provides the advantages of allowing a membrane unit to be placed subsea, meeting the requirements of compactness, retrievability, reliability, and the ability to withstand harsh conditions (including extreme external pressures) required for subsea equipment.

These embodiments according to the present invention, shown in FIGS. 1-3 and as described above, allows a membrane separation system to be adapted for subsea use and placement on the seafloor, close to a production wellhead and a reinjection wellhead. This provides advantages of allowing $CO_2$ to be separated out of a well stream 1A/101A at the seafloor and reinjected for deposit and/or pressure support in a reservoir.

In a further aspect of the present invention, the cooler 7 or 111 is adapted to provide an output temperature so that the stream 7A/111A has a density favorable for injection of the stream 7A/111A into a storage reservoir. This temperature can, for example, be 30° C. or below. This increase in the density of stream 7A/111A produces a larger static head of this stream between the separation plant at the seafloor and the subsurface reservoir in which the $CO_2$ is to be deposited. The work required for transporting the stream 7A/111A is thus reduced.

In another aspect of the present invention, the cooler 7 or 111 is adapted to control the temperature so that the stream 7A/111A has a temperature providing a suitable fluid density but being above a pre-set hydrate formation temperature. This pre-set temperature may depend on the prevailing conditions and mode of operation (e.g., use of WAG/SWAG), and may, for example, be below 30° C. but higher than 20° C. The lower temperature limit is set by the conditions for formation of hydrates at the specific operating conditions. The upper temperature limit is governed by the cooling need to obtain the desired increase in density of $CO_2$ before injection into the injection well. This provides the advantage of producing a sufficiently dense phase in the stream 7A, which is advantageous for the pumping of the $CO_2$ into the reservoir, but at the same time provides that no hydrates can be formed if stream 7A comes in contact with water, for example, during WAG operations.

In yet another aspect of the present invention, cooler 7/111 is actively controlled to maintain a temperature providing a suitable fluid density of stream 7A/111A while staying above a pre-set hydrate formation limit. This can, for example, be achieved by regulating an external heat transfer coefficient for the cooler 7/111.

Design Example

An example of the performance of the present invention is given below to aid the understanding of one possible implementation of the present invention. The calculations and mass balances are derived for one optimized example of a system as shown in FIG. 2 and are presented by way of example only.

The well stream 101A typically has a temperature around 90° C. and a pressure of 70 bar. Total flow of fluids in the stream amounts to about 193 kg/s where the total content of $CO_2$ amounts to 75.3 kg/s. The cooler 102 reduces the temperature to about 40° C. and about 4.5 kg/s of $CO_2$ is removed by the water separated in the separator 103. The choke valve 112 in stream 103B reduces the pressure of stream 103B to about 15° C. and this stream is further heated to about 90° C. in the heat exchanger 104. The liquid phase 105A from the gas/liquid separator contains a total flow of about 10.7 kg/s, where about 0.6 kg/s is made up of $CO_2$. The gas phase 105B has a total flow of components equal to about 73.7 kg/s where about 70.1 kg/s is $CO_2$. The $CO_2$ enriched stream 106B leaving the membrane separator 106 contains a total flow equal to about 65.8 kg/s where the $CO_2$ flow constitutes about 65.0 kg/s. The hydrocarbon enriched retentate stream 106A from the membrane separator has a total flow of about 8.0 kg/s with a $CO_2$ content that amounts to about 7.1 kg/s. The gas phase leaving the demister 107 is further treated in the second membrane separator so that the mixed $CO_2$ enriched stream entering into the cooler 109 has a total mass flow of about 70.8 kg/s where the $CO_2$ content constitutes about 69.6 kg/s and the pressure is about 15 bar. The cooler reduces the temperature of the stream to about 50° C. The compressor increases the pressure of the gas stream to about 82.4 bar and a temperature equal to about 233° C. The stream 110A is passed through the heat exchanger 104 where the temperature is reduced to about 119° C. and the temperature in the cooler 111 is further reduced to about 30° C. Stream 111A has then properties that allow injection of the $CO_2$ enriched gas that provide a high liquid head in the injection well. The total flow of the stream 111A is about 70.8 kg/s where the $CO_2$ flow constitutes about 69.6 kg/s or about 98 wt.-% of this stream.

In this example, the stream 112A will contain a total flow of fluids equal to 13.7 kg/s where the $CO_2$ content constitutes about 1.1 kg/s. The amount of $CO_2$ separated in the described arrangement of the present invention provides in this example more than 98% removal of the incoming $CO_2$.

In relation to the mixing conditions of the separated fluids, reference is again made to FIG. 2. Fluid stream 103A does contain water that is saturated with $CO_2$ at a typical temperature of about 40° C. Stream 111A contains the enriched, compressed and cooled $CO_2$ stream and the temperature is typically about 30° C. Since these temperatures are above critical temperatures for the formation of hydrates as described above, the streams can be mixed without any concerns to hydrate formation and a complex injection template arrangement. Each of the streams or a mixed stream can alternatively be routed to a separate injection well. In an alternative embodiment, should the streams 103A and 111A need to be mixed with externally supplied fluids, their temperatures can be controlled to avoid hydrate formation as described above.

The present invention thus allows for the removal of typically more than 95% of the $CO_2$ coming from a well stream resulting from an oil reservoir that is flooded with $CO_2$.

The present invention is not limited to embodiments described herein; reference should be had to the appended claims.

What is claimed is:

1. A subsea fluid processing system configured to receive a wellstream flow, the subsea fluid processing system comprising:
a pressure control device configured to regulate a pressure of the wellstream flow;
a gas-liquid separator unit configured to receive the wellstream flow downstream of the pressure control device and to provide a liquid stream and a gas stream;
a first membrane separator configured to receive the gas stream and to provide a retentate stream and a permeate stream;
a compressor configured to receive the permeate stream and to provide a compressed permeate stream;
a discharge cooler configured to receive the compressed permeate stream and to provide a cooled compressed permeate stream for injection into a subsurface reservoir; and
a heat exchanger configured to transfer heat from the compressed permeate stream to the wellstream flow,
wherein, a density of the cooled compressed permeate stream is higher than a density of the compressed permeate stream.

2. The subsea fluid processing system as recited in claim 1, further comprising:
a membrane unit; and
a demister,
wherein,
the membrane unit comprises the first membrane separator and a second membrane separator which is arranged in series with the first membrane separator, and
the demister is arranged between the first membrane separator and the second membrane separator.

3. The subsea fluid processing system as recited in claim 2, further comprising:
a pressure vessel configured for subsea use and to have arranged therein a membrane cartridge assembly comprising a plurality of membrane cartridges,
wherein,
at least one of the first membrane separator and the second membrane separator is arranged in the pressure vessel, and
the first membrane separator or the second membrane separator comprises the plurality of membrane cartridges.

4. The subsea fluid processing system as recited in claim 1, further comprising:
an inlet cooler; and
an inlet separator,
wherein the inlet cooler and the inlet separator are each arranged in the wellstream flow upstream of the pressure control device.

5. The subsea fluid processing system as recited in claim 1, wherein the discharge cooler is further configured to provide the cooled compressed permeate stream at a temperature which is higher than a pre-set hydrate formation temperature.

6. The subsea fluid processing system as recited in claim 5, wherein the pre-set hydrate formation temperature is 20° C.

7. The subsea fluid processing system as recited in claim 1, wherein the discharge cooler is further configured to cool the cooled compressed permeate stream to a temperature which is lower than a dense phase temperature of the cooled compressed permeate stream.

8. The subsea fluid processing system as recited in claim 7, wherein the dense phase temperature of the cooled compressed permeate stream is 30° C.

9. The subsea fluid processing system as recited in claim 1, wherein the discharge cooler is further configured to be actively controlled so that a cooling power of the discharge cooler is adjustable.

10. The subsea fluid processing system as recited claim 1, wherein the first membrane separator comprises a membrane unit which is configured to provide a selective passing of a $CO_2$ gas therethrough.

11. The subsea fluid processing system as recited in claim 1, wherein the discharge cooler is further configured to use ambient seawater as a cooling medium.

12. A method of processing a wellstream flow, the method comprising:
- operating a pressure control device to regulate a pressure of the wellstream flow;
- receiving the wellstream flow in a gas-liquid separator unit;
- operating the gas-liquid separator unit to provide a liquid stream and a gas stream;
- receiving the gas stream in a first membrane separator;
- operating the first membrane separator to provide a retentate stream and a permeate stream;
- compressing the permeate stream in a compressor to provide a compressed permeate stream;
- cooling the compressed permeate stream in a discharge cooler to provide a cooled compressed permeate stream;
- injecting the cooled compressed permeate stream into a subsurface reservoir; and
- transferring heat from the compressed permeate stream to the wellstream flow, wherein,
- the method is performed in a subsea environment.

13. The method as recited in claim 12, wherein,
the cooling of the compressed permeate stream in the discharge cooler comprises cooling the compressed permeate stream to a temperature which is higher than a pre-set hydrate formation temperature.

14. The method as recited in claim 13, wherein the pre-set hydrate formation temperature is 20° C.

15. The method as recited in claim 12, wherein,
the cooling of the compressed permeate stream in the discharge cooler comprises cooling the compressed permeate stream to a temperature which is lower than a dense phase temperature of the cooled compressed permeate stream.

16. The method according to the preceding claim 15, wherein the dense phase temperature of the cooled compressed permeate stream is 30° C.

17. The method as recited in claim 12, further comprising:
actively controlling the discharge cooler so as to adjust a cooling power thereof.

18. The method as recited in claim 12, further comprising:
transferring heat from the discharge cooler to ambient sea water.

* * * * *